FIG. I.

INVENTOR.
Guy O. Conner
BY W. H. Woodlief
Attorney

Nov. 10, 1964  G. O. CONNER  3,156,122
SPINDLE CONTROL FOR THREADING MACHINES
Original Filed March 12, 1951  3 Sheets-Sheet 2

INVENTOR.
GUY O. CONNER
BY
W. H. Woodlief
ATTORNEY

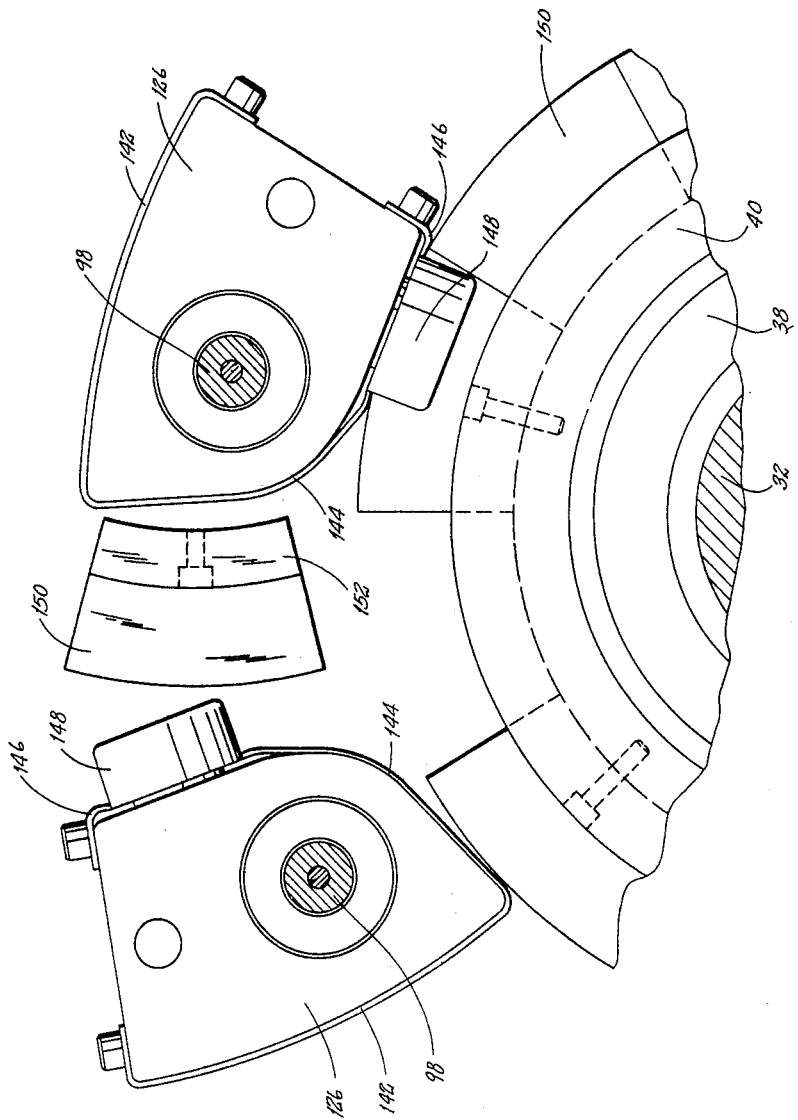

3,156,122
SPINDLE CONTROL FOR THREADING
MACHINES
Guy O. Conner, Cleveland, Ohio, assignor to Republic Steel Corporation, Cleveland, Ohio, a corporation of New Jersey
Application Mar. 25, 1958, Ser. No. 723,865, now Patent No. 3,036,319, dated May 29, 1962, which is a division of application Ser. No. 215,131, Mar. 12, 1951, now Patent No. 2,828,492, dated Apr. 1, 1958. Divided and this application May 31, 1961, Ser. No. 113,872
4 Claims. (Cl. 74—22)

This invention pertains to machine tools for forming metal and more particularly to a machine adapted for high speed performance of a variety of operations such as spinning, tapping, drilling, or the like. The invention has particular utility in the tapping or threading of nuts, and other operations similar to these. This application is a division of my application for United States patent, Serial No. 723,865, filed March 25, 1958, now United States Patent No. 3,036,319, for Tool Holder and Operating Means, which latter application was a division of my application for United States patent, Serial No. 215,131, filed March 12, 1951, for Nut Tapping Machine Having Releasable Tap Holding Means to Discharge Tapped Nuts Therefrom, now United States Patent No. 2,828,492.

This application concerns itself with the mechanism by which the tool spindles are controlled as they are driven through the workpieces. In particular, it is an object of this invention to provide a drum cam and follower block arrangement which contributes greatly to the performance of the machine.

A more complete understanding of the device of the invention, and the invention itself, may be had by reference to the following description and drawings which form a part of this specification.

In the drawings:

FIG. 3 is a partially exploded, end-elevational view of two of the follower blocks and a portion of the drum cam showing the method of removal of the cam segments.

Briefly, my invention forms part of an automatic machine having one or more horizontal spindles operated from a central shaft. The spindles, in addition to being rotated about the central axis of the machine, revolve to drive a tool and are moved axially by a stationary drum cam. The spindles are very accurately and firmly located to avoid misalignment or play. The spindles are arranged around the central axis of the machine in two matched sets, each spindle having an axially aligned, matching spindle facing it from the opposite set. Reference to my Patent 2,828,492 will clarify any question concerning this arrangement. Tool holding heads are adapted to hold a tool very firmly yet are able to release the tool to be picked up by the opposite head. Cam operated rods extending through the spindles provide positively operated means for passing the tool from one head to another. The tool is provided with shanks at both ends of the thread cutting part for the heads to grasp in order for the tool to be passed in this manner. It is conceived, however, that for some operations, the tool will not be passed, but that complementary tools may be held by opposing spindles thus performing different types of operation.

The center of the machine between the two spindles is occupied by a work holding mechanism adapted to receive a workpiece for each pair of spindles. The work holder securely clamps the workpiece in a fixed position determined by a pilot part of the forming tool and is thus accurately located relative to the spindles. The work holder carries the workpiece along in fixed relation to the spindles to a discharge point where it is discharged positively from the work holder.

My aforesaid Patent 2,828,492 contains a detailed disclosure of the machine in which the spindle control mechanism herein is employed. Therefore, the general characteristics of the machine will be here described only to the extent necessary to an understanding of the spindle control mechanism.

The following more specific description will be made with reference to the drawings and will pertain particularly to the machine as set up to thread nuts. It is not my purpose, however, so to limit my invention.

Figure 1:
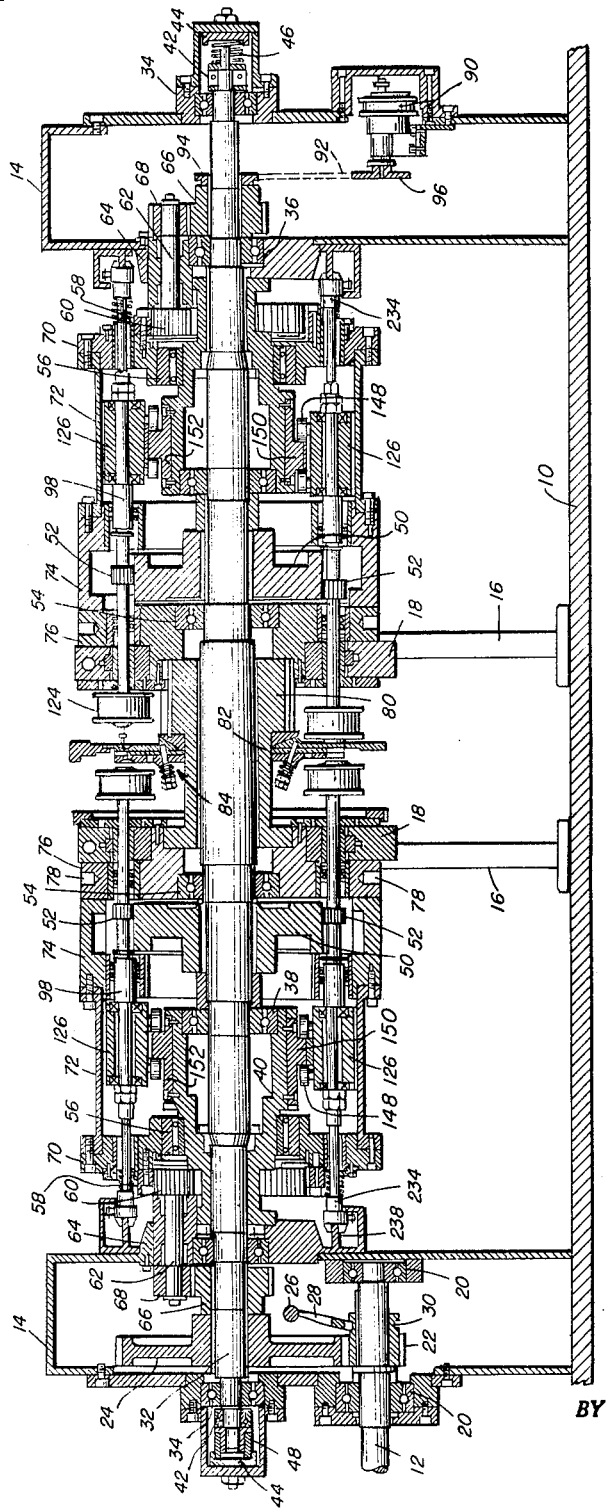
FIG. 1 is a longitudinal medial sectional view through the machine.

In FIG. 1 the character 10 designates the base on which the machine is mounted. A main drive motor (not shown) is mounted at one end of the base and is connected to a drive shaft 12 by a suitable coupling. The supporting structure for the machine includes end standards 14 which comprise not only end supports for the machine but also housings for the gear drives and certain auxiliary equipment as will appear later. Auxiliary supports 16 for the center section are also mounted on the base 10. The supports 16 are merely legs carrying guide members 18. When the machine is in operation, suitable covers are employed to enclose the mechanism.

As is best shown in FIG. 1, the drive shaft 12 is journalled in ball bearings 20, in the left hand standard 14. A pinion 22 is mounted on the shaft 12 and is splined thereto such that it may be moved into or out of engagement with a gear 24 by manipulating a fork shifting arrangement comprising a shaft 26 to which is fixed a shifting fork 28. This fork engages a groove 30 in a collar on the pinion 22 in a manner well known in the art and thus is adapted to shift the pinion into and out of driving engagement with the gear 24.

The drive from the pinion is normally transmitted to the gear 24 and thence to a main drive shaft 32. The shaft 32 is journalled near its end in end bearings 34 in the outer walls of both standards 14 and also in near end bearings 36 in the inner walls. Still further support is provided approximately midway between the center of the shaft and both ends by near center bearings 38 mounted in central stationary members 40. These latter members are bolted or otherwise suitably mounted on the inner walls of the standards 14 at both ends. Thus the shaft is supported by six bearings. Firm support such as this is necessary because the shaft is the sole support of nearly all of the operating mechanism of the machine. Furthermore, such support will help to prevent whipping of the long shaft. A thrust bearing 42 is provided at each end of the shaft. Adjustable cupped members 44 are fixed to the standards 14 and on one end adjust the compressive force of a spring 46. A spacer 48 is substituted for the spring 46 on the other end, but in other respects the devices on both ends are the same.

A pair of large "bull" or sun gears 50 are keyed to the shaft adjacent to and inboard of the near center bearings 38. These gears are the sun gears for two symmetrical planetary gear system formed by planetary pinions 52 carried about the sun gears 50 by an irregular shaped drum supported partly on the shaft by center bearings 54 and partly on the stationary members 40 by roller bearing 56. This drum is driven from both ends through internal ring gears 58, driven by pinions 60. The pinions 60, in turn, are keyed to similar countershafts 62 journalled in bearing brackets 64 mounted on the inner wall of the standards 14. These countershafts 62 are driven by the main shaft 32 through gears 66 keyed to the main shaft and meshing with gears 68 on the countershafts 62.

The main drum is substantially symmetrical end-forend, except directly at its center. The ring gears 58 are mounted on end plates 70 which also support the roller bearings 56. These end plates 70 are connected to the rest of the drum by cover members 72 which may conveniently be bolted to the end plates 70 and to spindle supporting members 74. The spindle supporting members 74 are fastened to inner wall members 76 on both sides of the center section of the machine. Holes 78 may be provided in the wall member 76 into which a bar may be inserted for turning the machine by hand if desired. The wall members 76 hold the center bearings 54 and so help to support the drum. A center hub 80 joins the wall members from both sides and completes the basic structure of the rotating drum. The hub 80 is the only part of the drum assembly which is not symmetrical, being formed with a shoulder 82 to which a face plate and clamping or work holding mechanism 84 is fastened. A second spindle support member 86 (FIG. 2) may be bolted or otherwise fastened to the wall members 76 on each drum, and a cover plate 88 may be used to cover the complete end of the assembly. The cover 88 and spindle support 86 slide freely relative to the guide member 18 and are particularly useful to provide proper lubrication and flushing of chips.

A small oil pump 90 may be mounted in one of the end supports 14 to provide lubrication for the gears and bearings in that support. The pump is driven by a chain 92 engaged with a sprocket 94 on the main shaft and driving a sprocket 96 on the pump shaft.

Figure 2:
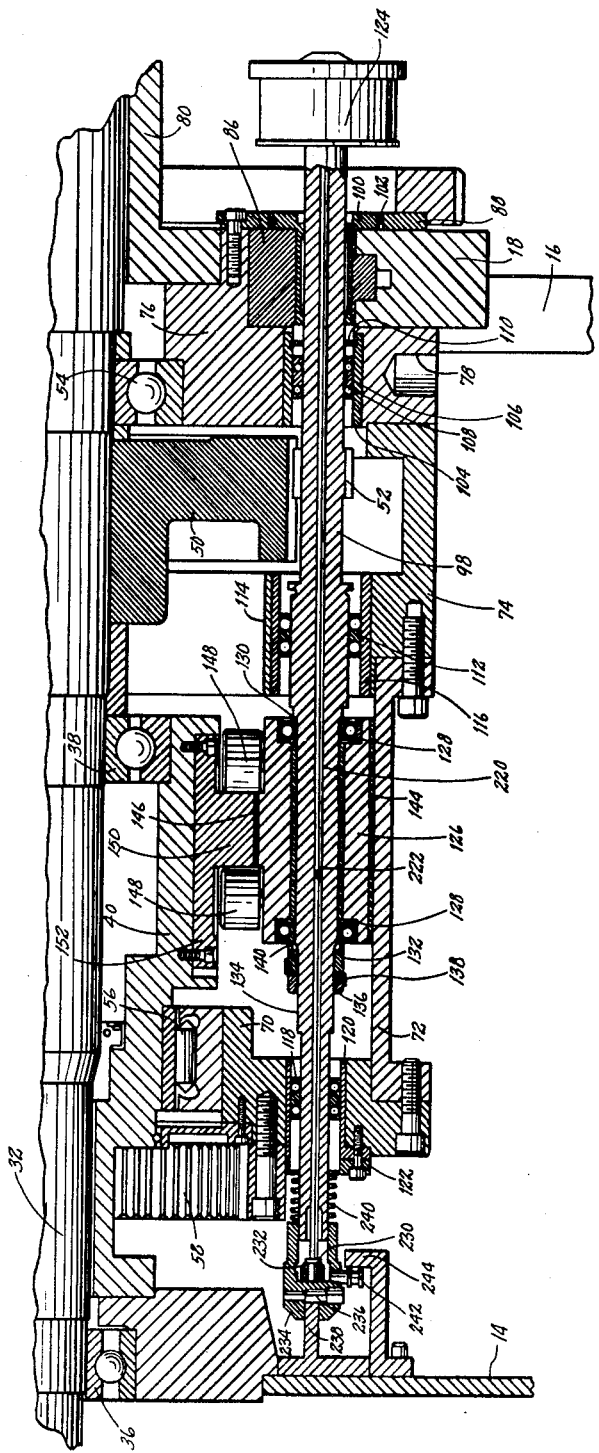
FIG. 2 is an enlarged sectional view of the spindle drive mechanism.

As noted above, the eight spindles on each side of the machine are driven by the meshing engagement of the bull gears 50 with the pinions 52 on the spindles (FIGS. 1 and 2). Each of the spindles is adapted for longitudinal as well as rotary motion, thus being adapted to carry driving heads which drive a tool in a rotary motion while feeding it through a nut blank, or other workpiece, and then following discharge of the finished nut, the heads carried by the spindles return the tool to its original position. It will be apparent that, while the shaft 32 is rotating in one direction, the spindle-carrying drum device will be driven in the opposite direction because of the internal gear drive at the ends of the drum. Thus, the pinions 52 are carried around the bull gears 50 in a planetary manner and consequently are driven at a comparatively high speed. The pinions 52 may be formed as a part of the spindle 98 itself or may be suitably fixed thereto. As best shown in FIG. 2, the spindle 98 extends through four of the individual members of the rotating drum. At its right hand end in that figure, the spindle is journalled in a bronze bearing bushing 100 pressed into the support member 86. Suitable packing 102 is provided between the cover 88 and the flange of the bushing to keep dirt and chips isolated from the bearings within the drum member, and to keep cutting fluid and the like within the bushing as will appear hereinafter.

The spindle 98 next passes through the end wall member 76. At this point, a hardened steel bushing 104 is pressed into the member. The surface of the spindle adjacent this bushing is also hardened. A form of ball bearing which will journal the shaft both for rotational and longitudinal motion is provided in the space between the bushing and the spindle. This bearing is formed by a sleeve 106 made of brass or similar material into which two or more circumferential rows of balls 108 are staked in holes formed therein. This assembly of balls and retainer is placed between the bushing 104 and the spindle shaft in that region which then acts as races for the ball bearing. It is evident that, in addition to the rotary motion of a regular ball bearing, the spindle can move longitudinally, rolling the balls 108 on the bushing 104 and causing the retainer and ball assembly to move longitudinally one-half the distance moved by the spindle. The bearing is formed so that the balls are preloaded. That is, the diameters of the balls are slightly greater than the space allowed for them between the bushing 104 and the spindle 98. This preload is preferably of the order of .0003 to .0005 inch. A snap ring 110 may be provided for this bearing and may also be used for the others to hold standard oil seal rings in place, if desired.

The second and third spindle bearings are similarly formed and preloaded. The second bearing 112 is located in an inwardly extending, wide flange 114 formed in the spindle support member 74. This bearing also includes a hardened bushing 116 pressed into an opening in the flange 114 as a race for the bearing. The third bearing 118 includes a bushing 120 pressed into the end plate 70 and on which the bearing may roll. A cover plate 122 may be provided at this end to protect the bearings and retain grease.

At its end nearest the center of the machine, each spindle carries a tool holding head 124. The pinion 52 is located between the first and second bearings 106 and 112, and a follower block 126 which controls the longitudinal movement of the spindle is located between the second and third bearings. The spindles are journalled in the follower block by two commercial angular contact ball bearings 128, one at each end of the block. A fixed position of the spindle relative to the block is maintained by engagement of one of the bearings with a shoulder 130 on the spindle against which the bearing is held by the pressure of a nut 132 against the other bearing. This nut is threaded on a threaded part 134 of the spindle shaft and is retained by a jam nut 136. A flanged washer 138 having portions bent over the flats of the nuts to prevent relative rotation therebetween is located between the nuts 132 and 136. The nut 132 may be partially bored out as shown (FIG. 2) to clear a shoulder 140 on the spindle.

As best shown in FIG. 3, the follower block 126 is an irregularly shaped block having an outer surface of particylindrical form. A sheet 142 of brass or bronze or other bearing material covers this outer surface and is wrapped around the block having a tongue 146 extending between the two rollers 148 on each block. The rollers 148 may be standard anti-friction bearings mounted on headed pins threaded or otherwise held in the block. They are spaced apart just far enough to straddle a cam ridge 150 formed on cam segment blocks 152 which are held in the stationary part 40 of the support for the machine. Thus, while the rollers straddle the cam ridge 150, of this drum cam, they will translate any change in the location of that ridge into longitudinal motion of the spindle. However, since the follower block is free to rotate on the spindle, it is necessary to have some means of holding it in a fixed position with the rollers engaging the ridge. This is accomplished by the engagement of the outer surface of the brass sheet 142 with the inner surface of the cover member 72 which is finished as a bearing surface for the follower blocks to slide on longitudinally. Because of their wide arcuate outer surface, the blocks are then restrained from turning about the spindles. Both the spindles 98 and the cover member 72 rotate about the center of the machine at the same speed. Therefore, the only motion between the cover 72 and the follower block is the longitudinal sliding induced by the cam.

In order to utilize the complete flexibility of the machine, it may be necessary at times to change the drum cam which controls the spindle movement. Unless this can be done without removing the spindles, the whole machine must be disassembled. Therefore, as shown in FIG. 3, the followers are designed to be moved to make possible the removal of the segments 152. This is accomplished by offsetting the rollers 148 from the spindles 98, so that the block 126 is eccentrically mounted and can rotate about the spindle when a cover 72 is removed to open a passageway through which the cam segments may be removed. Each entire cam is composed of twelve segments so that the segments are not so large as to be clumsy to manipulate, and the segmentization of the cam also permits adjustment of certain of the segments to provide a chip-breaking action, described hereinbelow. This size cam also allows reasonably easy removal of the first segment between the spindles. Subsequent segments may be more easily removed because they may slide around somewhat. The removal of each segment, however, is accomplished by loosening the holding screws and raising the segment somewhat and then tilting it as shown (FIG. 3) and bringing it out between the follower blocks. Installation of a new cam may be accomplished by reversing the operations. Thus, it is necessary only to remove the covers 72 preliminary to replacing a drum cam. This construction utilizes a close spacing of the spindles. It will be recognized that with a larger diameter machine or with fewer spindles, the spacing could be such as to allow removal of the segments without a tilting follower. However, these possibilities increase the cost or reduce the production rate of the machine and therefore are undesirable.

Movement of the spindles 98 by the drum cam is effective to carry the heads 124 toward and away from each other and thereby to drive a tool 154 through the blank and to pass it from one head to another. This movement may be modified to break chips formed by the tool in cutting material from the blank which may be desirable with certain classes of material, particularly when larger sizes of nuts are being threaded with the production of chips of a length which may cause jamming of the mechanism. This result is accomplished simply by offsetting certain of the cam segments 152 from the true line which the head would normally follow. This can be readily accomplished by grinding the cam to the desired feed with the segment 150 in a given relative position and then physically moving some of the segments in a direction which would cause a slight backing off of the tool cutting edge from the surface being cut, the overall results being an oscillation of the tool as the threads are cut. This motion is particularly desirable during the initial or roughing cuts, and the segments may be selectively offset to provide a chip-breaking action primarily during that period of motion of the tool. The amount of the offset may be of the order of the depth of cut being taken by the tool or somewhat less. Thus, at the offet segments, if desired, the cutting edge may be almost completely backed off, thus breaking the chips. For most operations, this offset of the segments will be only a few thousandths of an inch and will readily be accommodated by the mounting of the segments. The reason such small offsets are effective to produce the desired result is found in the roller type followers which fit snugly over the cam ridge 150 with substantially no clearance. This may be accomplished by preloading the followers. Therefore, any small variation in the cam is immediately transmitted from the follower through the spindle to the tool.

Precautions must be taken that the number of segments and the gear ratio of the spindle drive are not such that the tool is backed off each rotation at the same rotative position of the tool. It will be apparent, if the tool is rotated an even fraction of a turn while the follower is traversing one segment, and with similarly offset segments, the cut will be a wavy line. However, if the tool is rotated something other than an even fraction, the initial cut will be wavy, but following cutting edges will smooth out the waves, because they will be retracted at other points in the cut. Thus the final result is a uniformly smooth cut and is free from tearing because of jammed chips and also without waves because of the proper proportions of the machine.

In some cases it might be desirable, however, to cut a wavy line such as in the case of a product whose finished threads are of a high finish, for example. In such cases it would be possible, with this type of cam construction, to offset certain sized cam segments to produce an action where the tool would cut first on one side of a thread and then the other to produce a wavy line. This wave could then be eliminated by a steady feeding final cut which would just shave off a very fine cut from the threads. This construction would require a longer tool with thread cutting edges ground for the particular cuts to be taken. The final cut being very thin could leave a fine finish on the threads as desired. Variations of these arrangements will readily occur to those skilled in the art.

In FIGS. 1 and 2 the tool-carrying head 124 is shown carried unsupported at the end of the spindle. The specific construction and operation of the head is fully disclosed in my above-noted patent and application for patent. It will, therefore, not be specifically described in this application.

The tool is pushed out of the head by a rod 220 (FIG. 2) extending through a central opening 222 in the spindle. The rod 220 is formed with a shoulder (not shown) adapted to engage the rear face of a tool retainer (not shown) in the head 124 to assure that it is moved to its outer position in place to receive the tool when it is again picked up by the head.

Movement of the rod 220 is induced by a cam and follower arangement at the oposite end of the spindle from the head (FIG. 2). At this end, a collar 230 is formed on the rod to engage a small ball thrust bearing 232 held in a follower member 234. The follower member is freely journalled on the end of the spindle 98, so that it is carried by the spindle, but leaves the spindle free to rotate while the follower may be sliding longitudinally of the spindle. A roller 236 journalled in the member 234 engages a cam track 238 which extends into a slotted opening in the member 234. A spring 240 engaging the member 234 and the cover 122 urges the member 234 against the cam track 238, but in order to assure positive following by the follower, a radially extending roller 242 may be used engaging the surface of a second cam track 244. The tracks 238 and 244 may preferably be separate for ease of assembly.

In its operation, as explained heretofore, the machine in its preferred embodiment is driven with two motions. The shaft 32 carrying the bull gears 50 rotates in a direction such that the top of the gears are approaching the observer in all figures. The drum carrying the spindles and work holding device rotates in the opposite direction.

From the foregoing description, it can be seen that the spindle cam 150 and the push rod cam 238 could be substantially parallel for all except a very small part of the travel of the spindles. Since this is true, it is obvious that the push rod 220 could be carried with spindles throughout most of their travel, and only short wedge-shaped cams used where necessary, to push the tool out of the respective heads. If such cams were to be used, the follower could be merely the end of the push rod which could slide on the cam for a short distance, or the follower could be formed by a ball retained on the end of the rod.

During the movement of the spindles longitudinally, they are also rotated because of the meshing of the pinions 52 with the gear 50. Since the spindles on one side are driven in unison with those on the opposite side, they are always in position to pass and receive the tool, and both are effective to drive the tool during the threading operation. The preloaded bearings 106, 112 and 118 are capable of both rotary and longitudinal motion, thus insuring a complete lack of play or whip in the spindles. Thus, the spindles are always true, and since the nut blanks are true, and both tool and blank are securely held, the threads will be cut to much closer tolerances than with prior machines using the conventional type hook tap.

It will be recognized that the number of spindles in a machine built according to my invention is not fixed, but that more or fewer could be used. If more spindles were used and the machine driven at the same rotational speed, the output would be proportionately faster. Thus it is possible with a multi-spindle machine to produce as many as 2500 nuts per minute as compared with present day production with conventional machines of from 50–100 nuts per minute. Moreover, the tool is no more expensive and perhaps less expensive than present day hook taps and, if made of suitable material, will last several times as long measured by the number of nuts produced per tap. This is true because of the complete lack of undesired relative motion between the tap and the nut blank, and because the use of fine fast cutting materials is feasible only with such a small tool. Thus my invention makes possible not only a greater production, but the upkeep cost, so far as tools go, is considerably less.

While the novel features of the invention have been illustrated and described in connection with specific embodiments of the invention, it is believed that these embodiments will enable others skilled in the art to apply the principles of the convention in forms departing from the exemplary embodiments herein, and such departures are contemplated by the claims.

What is claimed is:

1. Mechanism for controlling the longitudinal position of a rotatable and longitudinally movable tool driving spindle in a metal working machine comprising: a drum cam mounted in said machine having a cam ridge thereon, a tiltable block rotatably journalled but longitudinally fixed on said spindle, said spindle extending through said block eccentrically thereof, rollers mounted on said block on axes perpendicular to and displaced from the axis of said spindle, said rollers being positioned to fit snugly, one on each side of said ridge said block being formed with an arcuate surface opposite said rollers, and a removable annular surface in said machine adapted for sliding engagement by the arcuate surface of said block to prevent rotation of said block with said spindle and to permit said block to rotate away from said cam ridge when said annular surface is removed.

2. Mechanism for controlling the longitudinal position of a rotatable and longitudinally movable tool driving spindle in a metal working machine comprising: a drum cam mounted in said machine, said cam having a ridge thereon formed to feed said spindle toward a workpiece at a substantially fixed predetermined rate throughout the major portion of its length and having off-set portions so formed as to periodically withdraw said spindle a distance substantially equal to the thickness of a cut being taken on such workpiece effective to periodically break chips as they are being formed, follower means for said cam comprising a block rotatably journalled but longitudinally fixed on said spindle, means extending from said block adapted to contact both sides of said ridge whereby the longitudinal movement of said block and said spindle is controlled, an annular bearing surface in said machine, and a face on said block in sliding contact with said annular bearing surface whereby said block is held against rotation with said spindle.

3. Mechanism for controlling the longitudinal position of a rotatable and longitudinally movable tool driving spindle in a metal working machine comprising: a cam drum, a cam comprising a plurality of segments mounted on said drum, each said segment being formed with a ridge thereon, said cam ridge being formed along a line adapted to advance said spindle toward a workpiece at a fixed predetermined rate and some of said segments being offset in a direction axial of said drum to cause withdrawal of said spindle a distance substantially equal to the thickness of a cut being taken on such workpiece effective to periodically break chips as they are being formed, follower means for said cam comprising a block rotatably journalled but longitudinally fixed on said spindle, means extending from said block adapted to contact both sides of said ridge whereby the longitudinal movement of said block and said spindle is controlled, an annular bearing surface in said machine, and a face on said block in sliding contact with said annular bearing surface whereby said block is held against rotation with said spindle.

4. Mechansm for controlling the longitudinal position of a rotatable and longitudinally movable tool driving spindle in a metal working machine comprising: a drum cam composed of a plurality of removable segments mounted in said machine, a block rotatably journalled but longitudinally fixed on said spindle, said spindle extending through said block eccentrically thereof, cam following rollers mounted on said block on axes perpendicular to and displaced from the axis of said spindle, said rollers being positioned to fit snugly, one on each side of said ridge, said block being formed with a bearing surface opposite said roller, and fixed annular bearing surface in said machine adapted for sliding engagement by said bearing surface of said block to prevent rotation of said block with said spindle, said fixed bearing surface being removably mounted in said machine such that said block is tiltable on said spindle for the removal of cam segments when said fixed bearing surface is removed.

References Cited in the file of this patent

UNITED STATES PATENTS

| | | |
|---|---|---|
| 953,651 | West | Mar. 29, 1910 |
| 977,488 | Traub | Dec. 6, 1910 |
| 1,034,436 | Fishburne | Aug. 6, 1912 |
| 1,808,083 | Tibbelts | June 2, 1931 |
| 1,928,529 | Garrard | Sept. 26, 1933 |
| 1,934,044 | De Leeuw | Nov. 7, 1933 |
| 1,990,188 | Kabbel | Feb. 5, 1935 |
| 2,322,340 | Bechler | June 22, 1943 |
| 2,828,492 | Conner | Apr. 1, 1958 |